(12) United States Patent
Thiyagarajan et al.

(10) Patent No.: US 9,135,302 B2
(45) Date of Patent: Sep. 15, 2015

(54) QUERY REWRITE WITH A NESTED MATERIALIZED VIEW

(75) Inventors: Murali Thiyagarajan, Concord, NH (US); Praveen Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1998 days.

(21) Appl. No.: 12/043,908

(22) Filed: Mar. 6, 2008

(65) Prior Publication Data

US 2009/0228432 A1  Sep. 10, 2009

(51) Int. Cl.
*G06F 7/00* (2006.01)
*G06F 17/30* (2006.01)

(52) U.S. Cl.
CPC ................... *G06F 17/30457* (2013.01)
USPC ............ 707/717; 707/637; 707/759; 707/802

(58) Field of Classification Search
None
See application file for complete search history.

(56) References Cited

U.S. PATENT DOCUMENTS

| | | | |
|---|---|---|---|
| 5,991,754 A | 11/1999 | Raitto et al. | |
| 6,199,063 B1 | 3/2001 | Colby et al. | |
| 6,334,128 B1 * | 12/2001 | Norcott et al. | 1/1 |
| 6,449,606 B1 | 9/2002 | Witkowski | |
| 6,526,403 B1 | 2/2003 | Lin et al. | |
| 6,629,094 B1 | 9/2003 | Colby et al. | |
| 7,233,944 B2 * | 6/2007 | Ahmed | 1/1 |
| 7,599,925 B2 | 10/2009 | Larson et al. | |
| 2004/0122814 A1 | 6/2004 | Zhang et al. | |
| 2005/0210010 A1 | 9/2005 | Larson et al. | |
| 2006/0122964 A1 | 6/2006 | Yu et al. | |
| 2006/0230017 A1 | 10/2006 | Larson et al. | |
| 2006/0271529 A1 | 11/2006 | Dhamijia et al. | |
| 2009/0024571 A1 | 1/2009 | Thiyagarajan et al. | |

OTHER PUBLICATIONS

Praveen Kumar and Murali Thiyagarajan, "Supporting Aggregate Expressions in Query Rewrite," pp. 1-18.
Randall G. Bello et al., "Materialized Views in Oracle," Proceedings of the 24$^{th}$ VLDB Conference, New York, USA, 1998, pp. 659-664.
Dr. Lilian Hobbs, "Oracle Materialized View & Query Rewrite," May 2005, pp. 1-25.

* cited by examiner

*Primary Examiner* — Hosain Alam
*Assistant Examiner* — Bruce Witzenburg
(74) *Attorney, Agent, or Firm* — Hickman Palermo Becker Bingham LLP (57) ABSTRACT

A query, issued to a database server, is re-written with a nested materialized view. The selected materialized view is nested within a "parent" materialized view that has one or more nesting levels for one or more nested materialized views. The selected nested materialized view has a cardinality associated therewith, which is lower than the cardinality associated with any of the other nested materialized views, and is nested at a final nesting level of the one or more nesting levels.

12 Claims, 5 Drawing Sheets

Example Cardinality In-Memory Tree Structure 100

Fig. 5

QUERY REWRITE WITH A NESTED MATERIALIZED VIEW

TECHNOLOGY

The present invention relates generally to computing queries. More specifically, embodiments of the present invention relate to rewriting queries with a nested materialized view.

BACKGROUND

Information is conveniently stored in repositories such as databases. Stored information is accessed and updated with applications executing in a database management system (DBMS). A DBMS may include one or more database servers that manage access to a database. A DBMS thus functions both to efficiently store information in one or more containers and as a database server to efficiently retrieve the information therefrom, on request. Each of the data containers of a database contains records. The data within each record is organized into one or more attribute fields. Various database architectures exist.

The data containers of relational databases are tables and the records stored therein are rows. The database can contain virtually any number of tables, the attributes of which, are referred to as columns. The data containers of an object oriented database are object classes, the records of which comprise objects, which have attributes referred to as object attributes. Other database architectures also exist. For simplicity and unity herein, a relational database is discussed, solely by way of example.

To retrieve data stored in a database, queries are submitted to a database server, which computes the query and returns the data requested therewith. Query statements submitted to a database server typically conform to the syntax of a particular database language supported by the DBMS. SQL (Structured Query Language) and PL/SQL (Procedural Language/SQL) are well known examples of such languages. Other database languages, some of them proprietary, are also used. For simplicity and unity, and solely by way of example, SQL statements are discussed herein. Unless otherwise indicated, terms and phrases are used herein in contexts explained in the four paragraphs that follow, below.

Views can allow the results of some queries to be computed more efficiently. The term "view" refers to a predefined query that is treated as a table. A view is thus essentially a virtual table and may be referenced by a database statement as if the view were an actual table. Tables that actually store the data associated with a view are referred to as "base tables." Base tables are referenced, directly or indirectly, by the predefined query. To generate the rows of a view, data is extracted and derived from the base tables. Changing data in a view's base table alters the data returned for a view.

Unless otherwise indicated, the term "Materialized View" (MV) refers to a view for which the results of the predefined query are stored as precomputed values. Materializing a materialized view obviates multiple executions of queries that may require significant time to compute. Thus, materializing a materialized view may allow faster and more efficient access to data.

Further, queries may be dynamically and transparently rewritten to reference one or more materialized views rather than base tables, which can boost database performance by allowing faster and more efficient computing of queries. Unless otherwise indicated, the term "query rewrite" herein refers to transforming a SQL query, expressed in terms of tables and views, into a statement that accesses the materialized views associated with those tables and views, instead. One or more other materialized views may be nested within a materialized view and may be used to facilitate some query rewrites. These nested materialized views may be nested as a sort of "child" within a "parent" materialized view.

Multiple nested materialized views may exist within a parent materialized view, each nested at a distinct nesting level thereof. The parent materialized view refers to the rows of a base table. In a hypothetical example materialized view having nested materialized views at N nesting levels, the first level materialized view refers to the parent materialized view. The second level nested materialized view refers to the first level materialized view. The third level nested materialized view refers to the second level materialized view and so forth, through an Nth level materialized view, which refers to the materialized view in the nesting level immediately preceding the Nth nesting level. As used herein, the term cardinality, as applied to a materialized view, including nested materialized views, refers to the number of rows of a base table or other materialized view, which is referenced with that materialized view.

As used herein, a subordinate set of a particular database object is essentially the set of all the database objects that refer, directly or indirectly, to that particular database object. For a base table, a particular materialized view that directly refers (i.e. whose definition refers) to the base table is in the subordinate set of the base table. A materialized view that refers to the particular materialized indirectly refers to the base table and is in the subordinate set of the base table. Similarly, the materialized views whose definition directly or indirectly refers to a particular materialized view is in the subordinate set of the materialized view. Nested materialized views are in the subordinate sets of their parent materialized view, as well as any nested materialized view between it and its parent.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Based on the foregoing, it would be useful to facilitate query rewrite using nested materialized views.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Rewriting queries with a nested materialized view is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to rewriting queries with a nested materialized view. A query, issued to a database server, is re-written with a selected nested materialized view. The selected materialized view is nested within a "parent" materialized view that has one or more nesting levels for one or more nested materialized views. The selected nested materialized view has a cardinality associated therewith, which is lower than the cardinality associated with any of the other nested materialized views, and is nested at a final nesting level of the one or more nesting levels.

The example embodiments described herein facilitate query rewrite using nested materialized views. Moreover, the example embodiments may thus enhance performance and efficiency relating to the operation of a DBMS.

In an embodiment, rewriting a query includes determining, from among set of candidate materialized views, which of the materialized views has the lowest cardinality value for the final nested materialized view. This materialized view is then selected for rewrite. In subsequent rewriting stages, the query may be rewritten using the materialized view at a next lower nesting level until eventually the query may be rewritten to use lowest nested materialized view with the lowest nested cardinality value. Information relating to parent-child and nesting level relationships of subordinate sets and the cardinality values of the members of the subordinate set may be stored persistently. In an embodiment, cardinality values, nesting levels and/or corresponding nested materialized view relationships is stored in metadata that is associated with a materialized view and its nested materialized views.

In an embodiment, rewriting a query with a nested materialized view includes loading, at query rewrite time, each of one or more nested materialized views that are at a first level of one or more nesting levels, e.g., a level closest to its parent materialized view. An in-memory cardinality tree structure is computed with a branch for each parent materialized view. Each of the branches represents one of one or more nested materialized views of parent materialized views. The tree structure is sorted to rank each of the one or more nested materialized views, based on the cardinality associated with each of the materialized views at the final nesting level. The nested materialized views are identified, which have the lowest cardinality value among the cardinalities of each nested materialized view at the final nesting levels. To rewrite the query, the parent materialized view is selected, which is identified as having the lowest cardinality at a final nesting level in the branch of the parent materialized view. The selection can be based on the persistently stored cardinality values, nesting level and relationship information, or computed on the fly.

Procedures that may be implemented with an embodiment may be performed with more or less steps than the example steps shown and/or with steps executing in an order that may differ from that of the example procedures. The example procedures may execute on one or more computer systems under the control of machine readable instructions encoded in one or more computer readable storage media.

The example procedures described herein may be performed in relation to rewriting queries with a remote object. Example embodiments may be implemented with a database management system (DBMS). Embodiments of the present invention are not limited to any particular database architecture. The repository may store a body of records in one or more data containers. A data container may conform to tables in a relational database, a collection of objects (i.e. instances of object classes) in an object oriented database, or the like. The records within the body of records may conform to rows in a table, objects of an object class, or the like. The attributes of the records may conform to columns of the rows of a table, object attributes, or the like.

For clarity, simplicity, unity, and brevity of description, the example procedures will be described with reference to a relational database. It should be appreciated however that embodiments are well suited to execution in any kind of database or other information repository architecture.

Example Query Rewrite Approaches

Queries may be rewritten with nested materialized views using an approach that considers the cardinality of the first nesting level and selecting, to rewrite the query, the nested materialized view with the lowest cardinality at the first level. As this approach takes instant selection of the lowest cardinality nested materialized view at the first nesting level, it may be thought of as a "greedy" approach; e.g., one which seeks "instant gratification." For instance, two query rewrite pathways may exist, which have associated cardinalities as shown in Example 1 below, with cardinalities indicated in parentheses, next to each nested materialized view (MV).

Path 1: MV1 (1000)→MV12 (400)→MV121 (150)

Path 2: MV2 (2000)→MV22 (600)→MV221 (50)        (Example 1)

Using the greedy approach, path 1 will be selected for rewriting a query, because MV1 has a cardinality that is lower than that of MV2.

Figure 1:
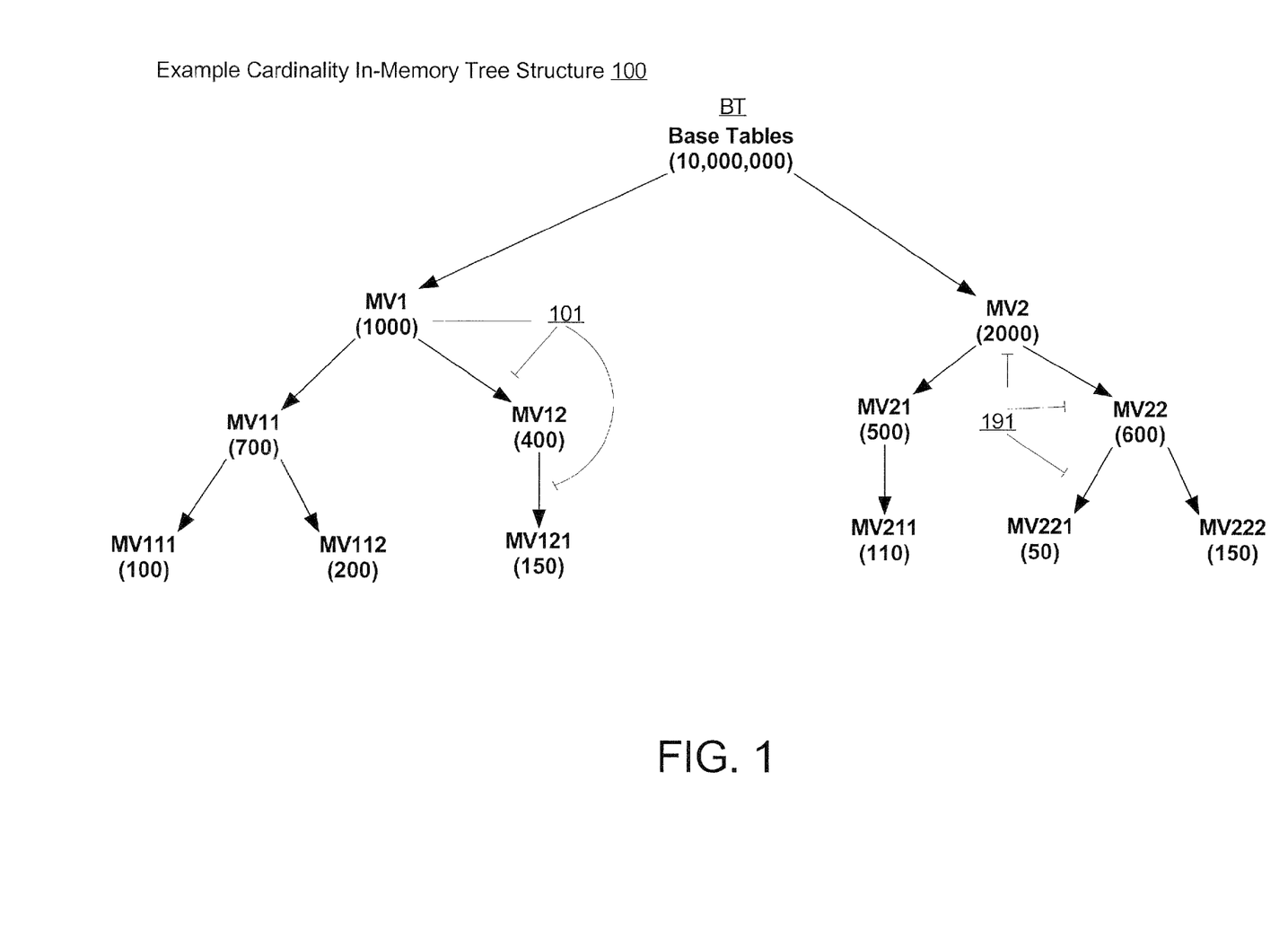
FIG. 1 depicts an example in-memory tree-structure, according to an embodiment of the present invention.

FIG. 1 depicts an example in-memory cardinality tree-structure 100, according to an embodiment of the present invention. Base tables BT have a cardinality of 10,000,000 rows. MV1 (with a cardinality of 1000) has a branch 101, which corresponds to Path 1, which includes MV12 (with a cardinality of 400) and MV121 (with a cardinality of 150), in that nesting level order. MV1 is at the first nesting level, MV12 the second, and MV121 the final nesting level (i.e. no materialized views refer to MV121). MV1 also has alternate branches. One includes MV1, MV11 (with cardinality of 700), and MV111 (with a cardinality of 100), the other branch includes MV1, MV11, and MV112 (with a cardinality of 200). MV111 and MV112 are at the final nesting level.

MV2 (with cardinality of 2000) has a branch 191, which corresponds to Path 2, which includes MV22 (with a cardinality of 600) and MV221 (with a cardinality of 50), in that nesting level order. MV2 is at the first nesting level, MV22 the second, and MV221 the final nesting level. MV2 also has alternate branches. One branch has MV2, MV22, and MV222 (with a cardinality of 150), another branch has MV2, MV21 (with a cardinality of 500), and MV211 (with a cardinality of 110). MV211, MV221, and MV222 are at a final nesting level.

The greedy approach essentially selects nested materialized views for rewriting a query based on a net reduction factor associated with the materialized views. The net reduction factor RF is a ratio of the sums of the cardinalities of matching base tables $C_T$, to the cardinality of the materialized view $C_{MV}$, as shown in Equation 1, below.

$$RF = C_{T1} + C_{T2} + \ldots C_{Tn-1} + C_{Tn})/C_{MV} \qquad \text{(Equation 1)}$$

In the greedy approach, a materialized view is essentially considered more optimal for rewriting a query if it has a higher net reduction factor. Eligible materialized views are sorted in descending order (e.g., of optimization for query rewrite) based on the net reduction factors.

The materialized view with the highest net reduction factor (e.g., at the front of the sorted list) is selected for use in rewriting the query. The net reduction factor is made available when information relating to a materialized view, such as metadata, is loaded at query rewrite time. When considering a particular materialized view, the greedy approach currently does not consider reduction factors associated with nested materialized views at lower levels. Using the greedy approach, a query optimizer may arrange the sorting according to the descending order of net reduction factors of the materialized views.

Figure 2:
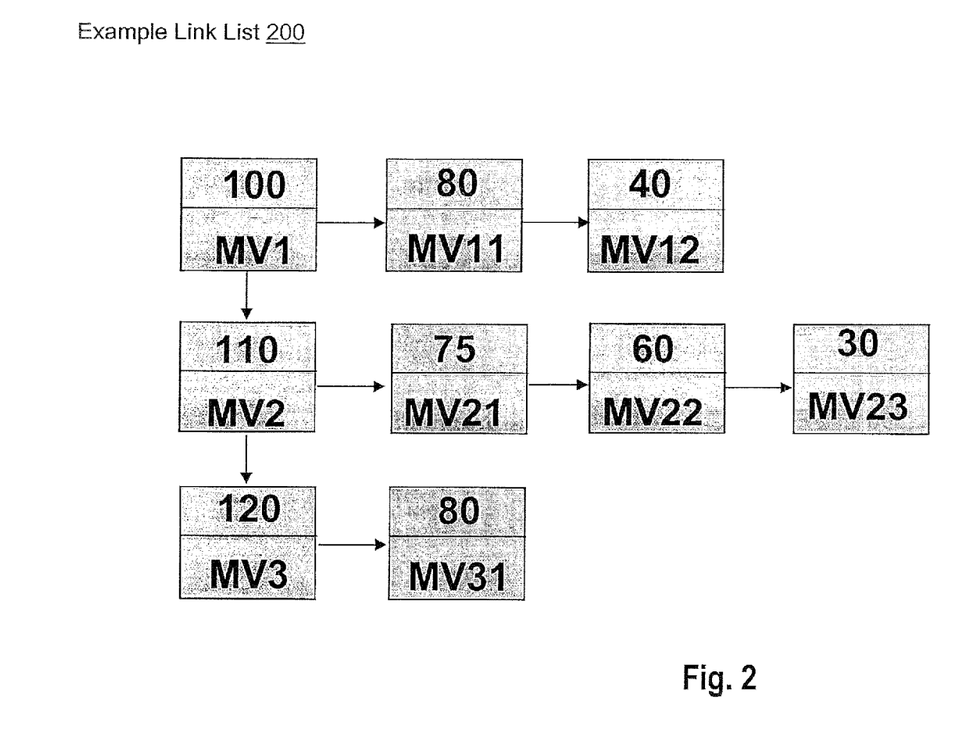
FIG. 2 depicts a first example query optimization link list arrangement.

FIG. 2 depicts an example query optimization list arrangement 200 listing branches of a cardinality tree ordered based on net reduction factors of the parent of each branch. MV1 has the highest net reduction factor at the first nesting level, with a cardinality of 100. Lower cardinality equates to a higher reduction factor. The greedy approach, seeking the materialized view with the highest net reduction factor at the first nesting level, first rewrites a query using MV1, followed by MV11 and, in the final nesting level, MV12. MV11 and MV12 have respective cardinalities of 80 and 40. In descending order based on their lower net reduction factors, MV2 is listed next in arrangement 200, followed by MV3. MV3 has a cardinality of 120 and MV131, which is at a nesting level below MV3, has a cardinality of 80. The nested materialized view at the next nesting level below MV2 is MV21, with a cardinality of 75, followed by MV22 and, at the final nesting level, MV23. MV22 and MV23 have respective cardinalities of 60 and 30.

As an application may rewrite a query more efficiently optimized using a nested materialized view with the lowest cardinality at the final nesting level, it may be more efficient to rewrite some queries using MV2 rather than MV1, because the nested materialized view at the final nested level for MV2 has the lowest cardinality of 30. Optimizing query rewrite using a nested materialized view with the lowest cardinality at the final nesting level may be achieved in an embodiment of the present invention.

Example Procedures

Figure 3:
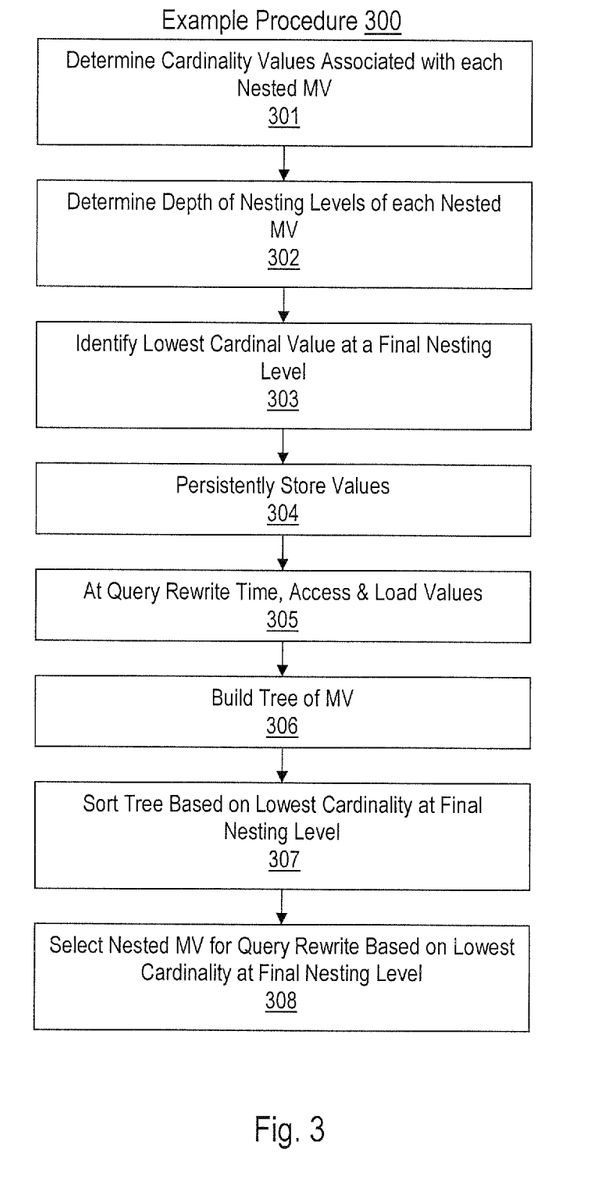
FIG. 3 depicts a flowchart for an example procedure, according to an embodiment of the present invention.

FIG. 3 depicts a flowchart for an example procedure 300, according to an embodiment of the present invention. In block 301, a cardinality value associated with each of one or more nested materialized views (MV) is determined. In block 302, the depth levels corresponding to each of one or more nested materialized views is determined. In block 303, the nested materialized view is identified, which has the lowest cardinal value at a final nesting level.

In block 304, information including the cardinality values and nesting levels, and for instance, relationships (e.g., nesting, parent-child, etc.) associated with each of the one or more nested materialized views is persistently stored and maintained. In an embodiment, the information is stored with subordinate set metadata associated with (e.g., corresponding to) each of the one or more nested materialized views. At query rewrite time in block 305, the information (e.g., values, nesting levels and relationships) is accessed and loaded.

In block 306, a memory based cardinality tree structure is computed, according to the loaded information. In block 307, the tree is sorted based on the lowest cardinality of a nested materialized view at the final nesting level. Based on having the lowest cardinality at the final nesting level, a nested materialized view is selected in block 308.

Procedure 300 may be implemented with an embodiment with more or less steps than the example steps shown and/or with steps executing in an order that may differ from that of the example procedure 300 depicted and described above. Procedure 300 may execute on one or more computer systems under the control of machine readable instructions encoded in one or more computer readable storage media.

Figure 4:
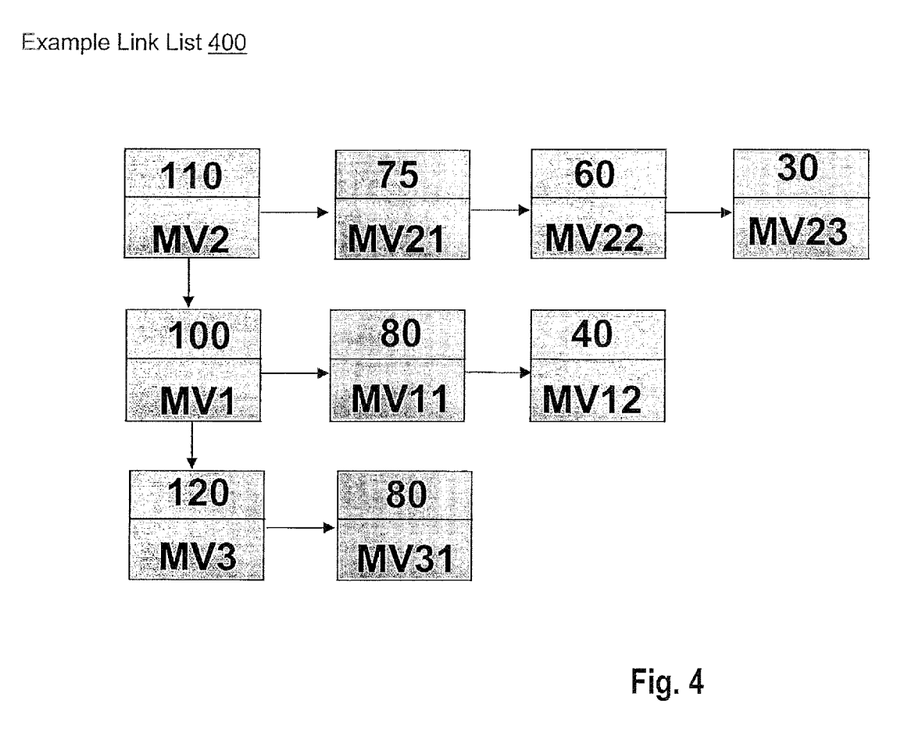
FIG. 4 depicts a second example query optimization link list arrangement, according to an embodiment of the present invention.

FIG. 4 depicts an example query optimization link list arrangement 400, according to an embodiment of the present invention. Arrangement 400 is computed in an embodiment by a process, procedure or the like, such as procedure 300 described above with reference to FIG. 3. Of all the nested materialized views shown in arrangement 400, MV23, with a cardinality of 30 has the lowest cardinality of any nested materialized view of the final nesting level. The other nested materialized views of the final nesting level, MV12 and MV31 have respective cardinality values of 40 and 80.

Thus, an embodiment selects MV23 over MV12 and MV31. A query is rewritten in an embodiment by selecting MV2 for the lead slot in arrangement 400 for rewriting the query, based on MV23 having the lowest cardinality of any nested materialized view of the final nesting levels of any nested materialized views associated with the front tier materialized views MV2, MV1 and MV3, and the parentage nesting relationship of MV2 to MV23.

Example Computer System Platform

Figure 5:
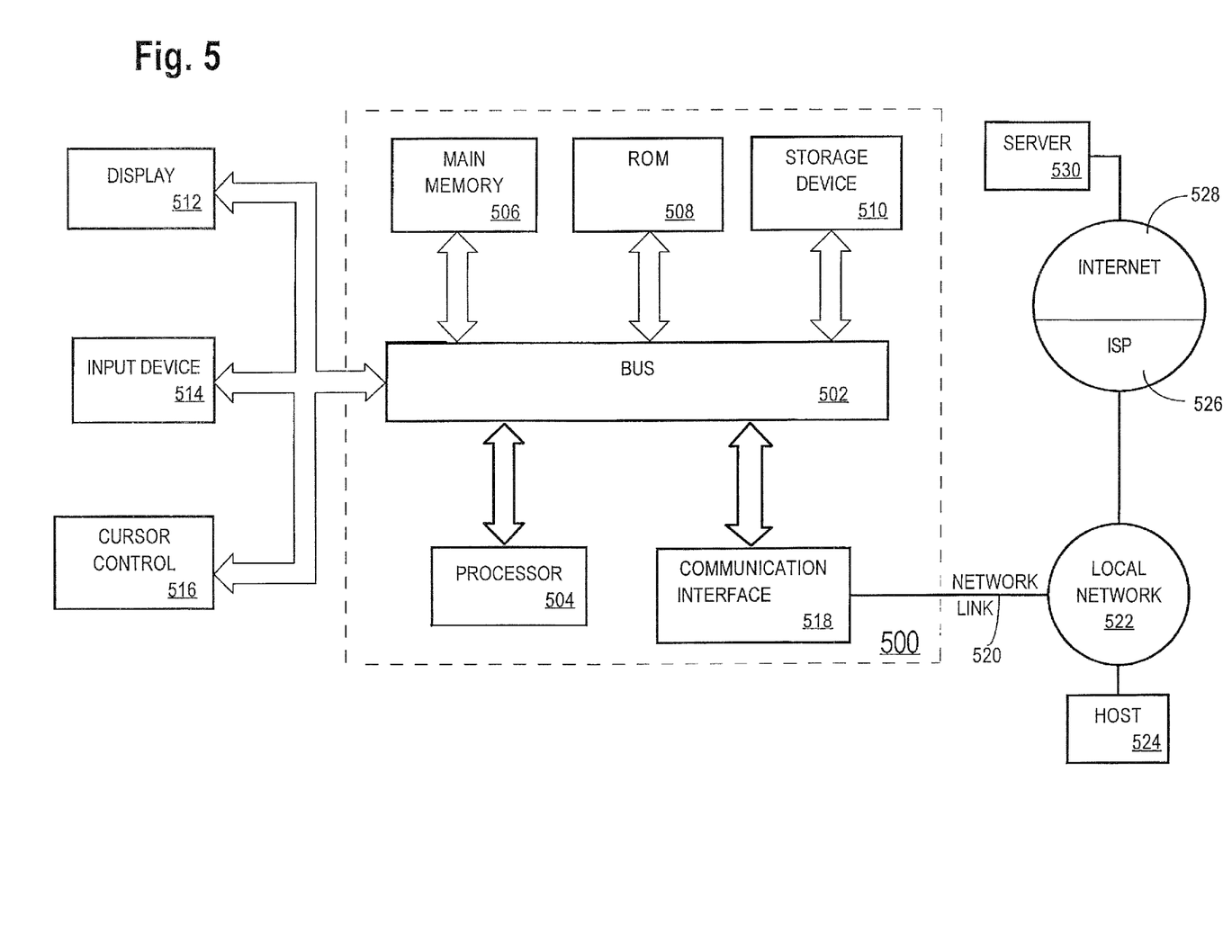
FIG. 5 depicts an example computer system platform, with which an embodiment of the present invention may be practiced.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), cathode ray tube (CRT) or the like, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for query rewrite with nested materialized views. According to one embodiment of the invention, query rewrite with nested materialized views is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem (modulator/demodulator). A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a digital subscriber link (DSL), cable or other modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for query rewrite with nested materialized views as described herein.

The received code may be executed by processor 504 as it is received, and/or stored in storage device 510, or other non-volatile storage for later execution. In this manner, computer system 500 may obtain application code in the form of a carrier wave.

Equivalents, Extensions, Alternatives, and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising steps of:
    selecting, from among a hierarchy of materialized views, only first-tier materialized views that depend directly on a base table;
    establishing a set of candidate materialized views that consists only of the first-tier materialized views;
    based on a cardinality of a nested materialized view that is a descendant of a particular first-tier materialized view, selecting the particular first-tier materialized view from among the set of candidate materialized views even though the particular first-tier materialized view does not have a lowest cardinality among cardinalities of first-tier materialized views in said set of candidate materialized views;
    based on said selecting, rewriting an existing query statement, which references said base table, into a rewritten query statement that references said particular first-tier materialized view instead of said base table;
    wherein said first-tier materialized view is a parent materialized view to another materialized view; and
    wherein said method is performed by one or more computing devices.

2. The method of claim 1, wherein said nested materialized view is nested at a final nesting level of one or more nesting levels associated with said parent materialized view.

3. The method of claim 1, wherein said selecting includes comparing cardinalities of certain nested materialized views associated with any of said set of candidate materialized views.

4. The method of claim 3, wherein comparing cardinalities includes comparing cardinalities of a set of certain nested materialized views at a final nesting level.

5. The method as recited in claim 1, further comprising a step of persistently storing information relating to relationships between each candidate materialized view of said set of candidate materialized views and respective one or more nested materialized views of said each candidate materialized view, and cardinality values and nesting levels associated with said each candidate materialized view and respective one or more nested materialized views.

6. A computer-implemented method, comprising:
  selecting a certain candidate materialized view from among a plurality of candidate materialized views, wherein each candidate materialized view of said plurality of candidate materialized views is associated with a respective nested materialized view at a final nesting level;
  wherein said selecting includes: (a) making a comparison of a cardinality of each respective nested materialized view at the final nesting level, and (b) selecting the candidate materialized view with a lowest cardinality based on said comparison; and
  based on said selecting, rewriting an existing query statement, which references a base table upon which a first-tier ancestor of the certain candidate materialized view directly depends, with a rewritten query statement that references the first-tier ancestor instead of the base table; and
  wherein the method is performed by one or more computing devices.

7. A non-transitory computer-readable storage medium storing one or more sequences of instructions, wherein execution of the one or more sequences of instructions by one or more processors causes the one or more processors to perform steps of:
  selecting, from among a hierarchy of materialized views, only first-tier materialized views that depend directly on a base table;
  establishing a set of candidate materialized views that consists only of the first-tier materialized views;
  based on a cardinality of a nested materialized view that is a descendant of a particular first-tier materialized view, selecting the particular first-tier materialized view from among the set of candidate materialized views even though the particular first-tier materialized view does not have a lowest cardinality among cardinalities of first-tier materialized views in said set of candidate materialized views;
  based on said selecting, rewriting an existing query statement, which references said base table, into a rewritten query statement that references said particular first-tier materialized view instead of said base table; and
  wherein said first-tier materialized view is a parent materialized view to another materialized view.

8. The non-transitory computer-readable medium of claim 7, wherein said nested materialized view is nested at a final nesting level of one or more nesting levels associated with said parent materialized view.

9. The non-transitory computer-readable medium of claim 7, wherein said selecting includes comparing cardinalities of certain nested materialized views associated with any of said set of candidate materialized views.

10. The non-transitory computer-readable medium of claim 9, wherein comparing cardinalities includes comparing cardinalities of a set of certain nested materialized views at a final nesting level.

11. The non-transitory computer-readable medium as recited in claim 7, wherein the steps further comprise persistently storing information relating to relationships between each candidate materialized view of said set of candidate materialized views and respective one or more nested materialized views of said each candidate materialized view, and cardinality values and nesting levels associated with said each candidate materialized view and respective one or more nested materialized views.

12. A non-transitory computer-readable storage medium storing one or more sequences of instructions, wherein execution of the one or more sequences of instructions by one or more processors causes the one or more processors to perform steps of:
  selecting a certain candidate materialized view from among a plurality of candidate materialized views, wherein each candidate materialized view of said plurality of candidate materialized views is associated with a repective nested materialized view at a final nesting level;
  wherein said selecting includes: (a) making a comparison of a cardinality of each respective nested materialized view at the final nesting level, and (b) selecting the candidate materialized view with a lowest cardinality based on said comparison; and
  based on said selecting, rewriting an existing query statement, which references a base table upon which a first-tier ancestor of the certain candidate materialized view directly depends, with a rewritten query statement that references the first-tier ancestor instead of the base table.

* * * * *

UNITED STATES PATENT AND TRADEMARK OFFICE
CERTIFICATE OF CORRECTION

Page 1 of 1

PATENT NO. : 9,135,302 B2
APPLICATION NO. : 12/043908
DATED : September 15, 2015
INVENTOR(S) : Thiyagarajan et al.

It is certified that error appears in the above-identified patent and that said Letters Patent is hereby corrected as shown below:

In the specification

Column 7, line 49, delete "link" and insert -- line --, therefor.

Column 8, line 19, delete "Alternatives, and" and insert -- Alternatives and --, therefor.

In the claims

Column 10, line 36, claim 12, delete "repective" and insert -- respective --, therefor.

Signed and Sealed this
Twenty-fourth Day of May, 2016

Michelle K. Lee
*Director of the United States Patent and Trademark Office*